United States Patent
Chen et al.

(10) Patent No.: US 6,772,179 B2
(45) Date of Patent: Aug. 3, 2004

(54) SYSTEM AND METHOD FOR IMPROVING INDEX PERFORMANCE THROUGH PREFETCHING

(75) Inventors: Shimin Chen, Pittsburgh, PA (US); Phillip B. Gibbons, Pittsburgh, NJ (US); Todd C. Mowry, Pittsburgh, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/034,450

(22) Filed: Dec. 28, 2001

(65) Prior Publication Data

US 2003/0126116 A1 Jul. 3, 2003

(Under 37 CFR 1.47)

(51) Int. Cl.[7] .............................................. G06F 17/30
(52) U.S. Cl. .......................... 707/204; 707/7; 707/101; 709/226; 712/207
(58) Field of Search ........................... 707/7, 101, 204; 709/226; 712/207

(56) References Cited

U.S. PATENT DOCUMENTS

| | | | | |
|---|---|---|---|---|
| 4,714,994 A | * | 12/1987 | Oklobdzija et al. | 712/207 |
| 5,355,478 A | * | 10/1994 | Brady et al. | 707/7 |
| 5,357,618 A | * | 10/1994 | Mirza et al. | 711/3 |
| 5,615,386 A | * | 3/1997 | Amerson et al. | 712/238 |
| 6,230,200 B1 | * | 5/2001 | Forecast et al. | 709/226 |
| 6,360,299 B1 | * | 3/2002 | Arimilli et al. | 711/137 |
| 6,453,389 B1 | * | 9/2002 | Weinberger et al. | 711/137 |
| 6,567,815 B1 | * | 5/2003 | Rubin et al. | 707/101 |

* cited by examiner

*Primary Examiner*—Charles Rones

(57) ABSTRACT

The present invention provides a prefetch system for use with a cache memory associated with a database employing indices. In one embodiment, the prefetch system includes a search subsystem configured to prefetch cache lines containing an index of a node of a tree structure associated with the database. Additionally, the prefetch system also includes a scan subsystem configured to prefetch cache lines based on an index prefetch distance between first and second leaf nodes of the tree structure.

21 Claims, 7 Drawing Sheets

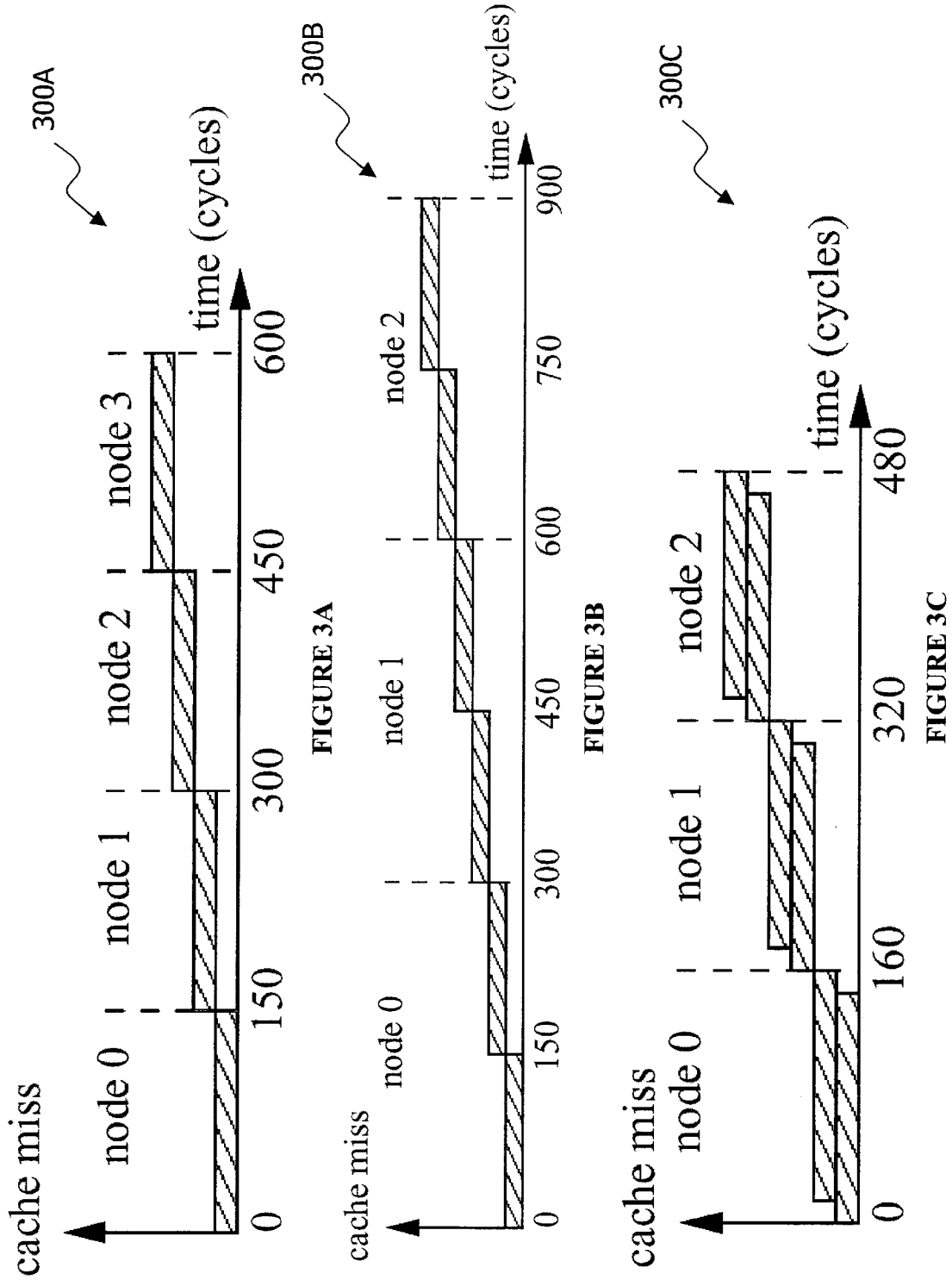

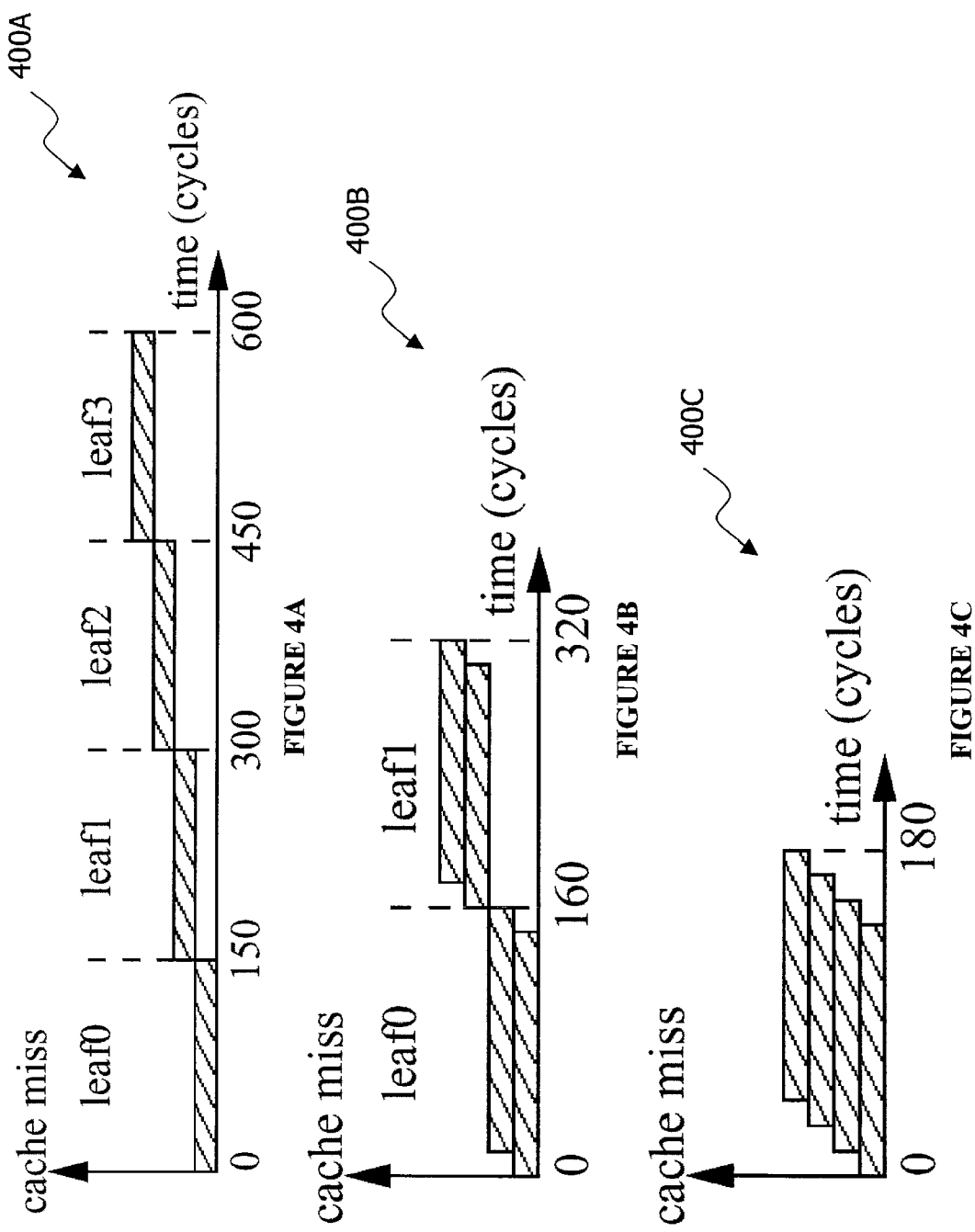

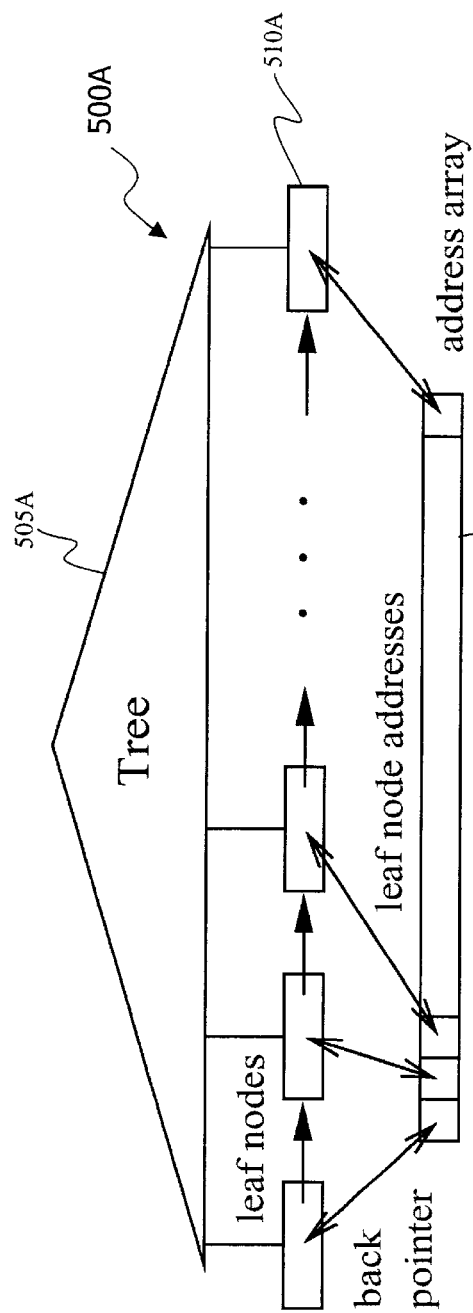
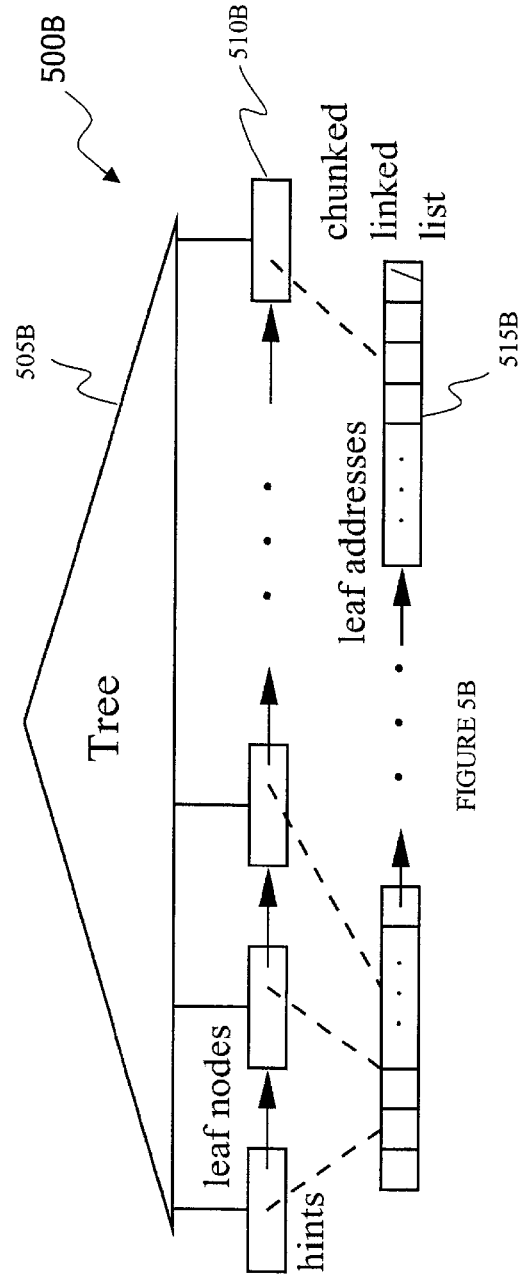

SYSTEM AND METHOD FOR IMPROVING INDEX PERFORMANCE THROUGH PREFETCHING

TECHNICAL FIELD OF THE INVENTION

The present invention is directed, in general, to database management and, more specifically, to a system and method for improving index performance through prefetching.

BACKGROUND OF THE INVENTION

As the gap between processor speed and both DRAM and disk speeds continues to grow exponentially, it is becoming increasingly important to make effective use of caches to achieve high performance on database management systems. Caching exists at multiple levels within modern memory hierarchies. Typically, two or more levels of SRAM serve as cache memories (or "caches," for short) for the contents of main memory in DRAM, which in turn may serve as a cache memory for the contents of a disk. Database researchers have historically focused on the importance of this latter form of caching (also known as a "buffer pool"). However, recent studies have demonstrated that even with traditional disk-oriented databases, roughly 50% or more of execution time is often wasted due to SRAM cache misses. For main-memory databases, it is even clearer that SRAM cache performance is crucial. Hence, attention has been directed in revisiting core database algorithms in an effort to make them more cache friendly.

Index structures are used extensively throughout database systems, and they are often implemented as $B^+$-Trees. While database management systems perform several different operations that involve $B^+$-Tree indices (e.g., selections, joins, etc.), these higher-level operations can be decomposed into two key lower-level access patterns. One of these is searching for a particular key, which involves descending from the root node to a leaf node using binary search within a given node to determine which child pointer to follow. The other is scanning some portion of the index, which involves traversing the leaves (leaf nodes) through a linked-list structure for a non-clustered index. For clustered indices, one can directly scan the database table after searching for the starting key. While search time is the key factor in single value selections and nested loop index joins, scan time is the dominant effect in range selections.

An example of cache performance of both search and scan on $B^+$-Tree indices may be considered by simulating their performance using a memory subsystem comparable to that associated with a Compaq ES40. A search experiment may look up 100,000 random keys in a main-memory $B^+$-Tree index after it has been bulkloaded with 10 million keys. A scan experiment performs 100 range scan operations starting at random keys, each of which scans through one million (key, tupleID) pairs retrieving the tupleID values. The results for shorter range scans (e.g., 1000 tuple scans) are similar. The $B^+$-Tree node size is equal to the cache line size, which is 64 bytes in this example. The results may be broken down into the three categories of busy time, data cache stalls, and other stalls. Results of the experiment indicate that both search and scan accesses on $B^+$-Tree indices spend a significant fraction of their time (i.e., 65% and 84%, respectively) stalled on data cache misses. Hence there appears to be considerable room for improvement.

In an effort to improve the cache performance of index searches for main-memory databases, the two other types of index structures cache-sensitive search trees" (CSS-Trees) and cache-sensitive $B^+$- Trees ($CSB^+$-Trees) have been studied. The premise of these studies is the conventional wisdom that the optimal tree node size is equal to the natural data transfer size. This corresponds to the disk page size for disk-resident databases and the cache line size for main-memory databases. Because cache lines are roughly two orders of magnitude smaller than disk pages (e.g., 64 bytes vs. 4 Kbytes), the resulting index trees for main-memory databases are considerably deeper. Since the number of expensive cache misses is roughly proportional to the height of the tree, it would be desirable to somehow increase the effective fanout (also called the branching factor) of the tree, without paying the price of additional cache misses that this would normally imply.

This may be accomplished by restricting the data layout such that the location of each child node can be directly computed from the parent node's address (or a single pointer) thereby eliminating all or nearly all of the child pointers. Assuming that keys and pointers are the same size, this effectively doubles the fanout of cache-line-sized tree nodes, thus reducing the height of the tree and the number of cache misses. CSS-Trees eliminate all child pointers, but do not support incremental updates and therefore are only suitable for read-only environments. $CSB^+$-Trees do support updates by retaining a single pointer per non-leaf node that points to a contiguous block of its children. Although $CSB^+$-Trees outperform $B^+$-Trees on searches, they still perform significantly worse on updates due to the overheads of keeping all children for a given node in sequential order within contiguous memory, especially during node splits.

The execution time of $CSB^+$-Trees (normalized to that of $B^+$-Trees) for the same index search experiment eliminate 20% of the data cache stall time, thus resulting in an overall speedup of 1.15 for searches. While this is a significant improvement, over half of the remaining execution time is still being lost due to data cache misses. In addition, these search-oriented optimizations provide no benefit to scan accesses, which suffer even more from data cache misses.

Accordingly, what is needed in the art is a way to enhance the effectiveness and efficiency of database searches and scans.

SUMMARY OF THE INVENTION

To address the above-discussed deficiencies of the prior art, the present invention provides a prefetch system for use with a cache memory associated with a database employing indices. In one embodiment, the prefetch system includes a search subsystem configured to prefetch cache lines containing an index of a node of a tree structure associated with the database. Additionally, the prefetch system also includes a scan subsystem configured to prefetch cache lines based on an index prefetch distance between first and second leaf nodes of the tree structure.

In another aspect, the present invention provides a method of prefetching for use with a cache memory associated with a database employing indices. The method includes prefetching cache lines containing an index of a node of a tree structure associated with the database. The method also includes prefetching cache lines based on an index prefetch distance between first and second leaf nodes of the tree structure.

The present invention also provides, in yet another aspect, a database management system including a computer employing a central processing unit, a main memory containing a database employing indices and a cache memory associated with the central processing unit and the main memory. The database management system also includes a prefetch system for use with the cache memory that is coupled to the database employing indices. The prefetch system has a search subsystem that prefetches cache lines containing an index of a node of a tree structure associated with the database, and a scan subsystem that prefetches cache lines based on an index prefetch distance between first and second leaf nodes of the tree structure.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 3A, 3B, and 3C collectively illustrate graphs showing cache misses versus cycle times for various search situations;

FIGS. 4A, 4B, and 4C collectively illustrate graphs showing cache misses versus cycle times for various scan situations;

FIG. 5A illustrates a block diagram showing an embodiment of a tree structure employing an independent and contiguous jump pointer array;

FIG. 5B illustrates a block diagram showing an embodiment of a tree structure employing a chunked, independent jump pointer array constructed in accordance with the principles of the present invention;

DETAILED DESCRIPTION

Figure 1:
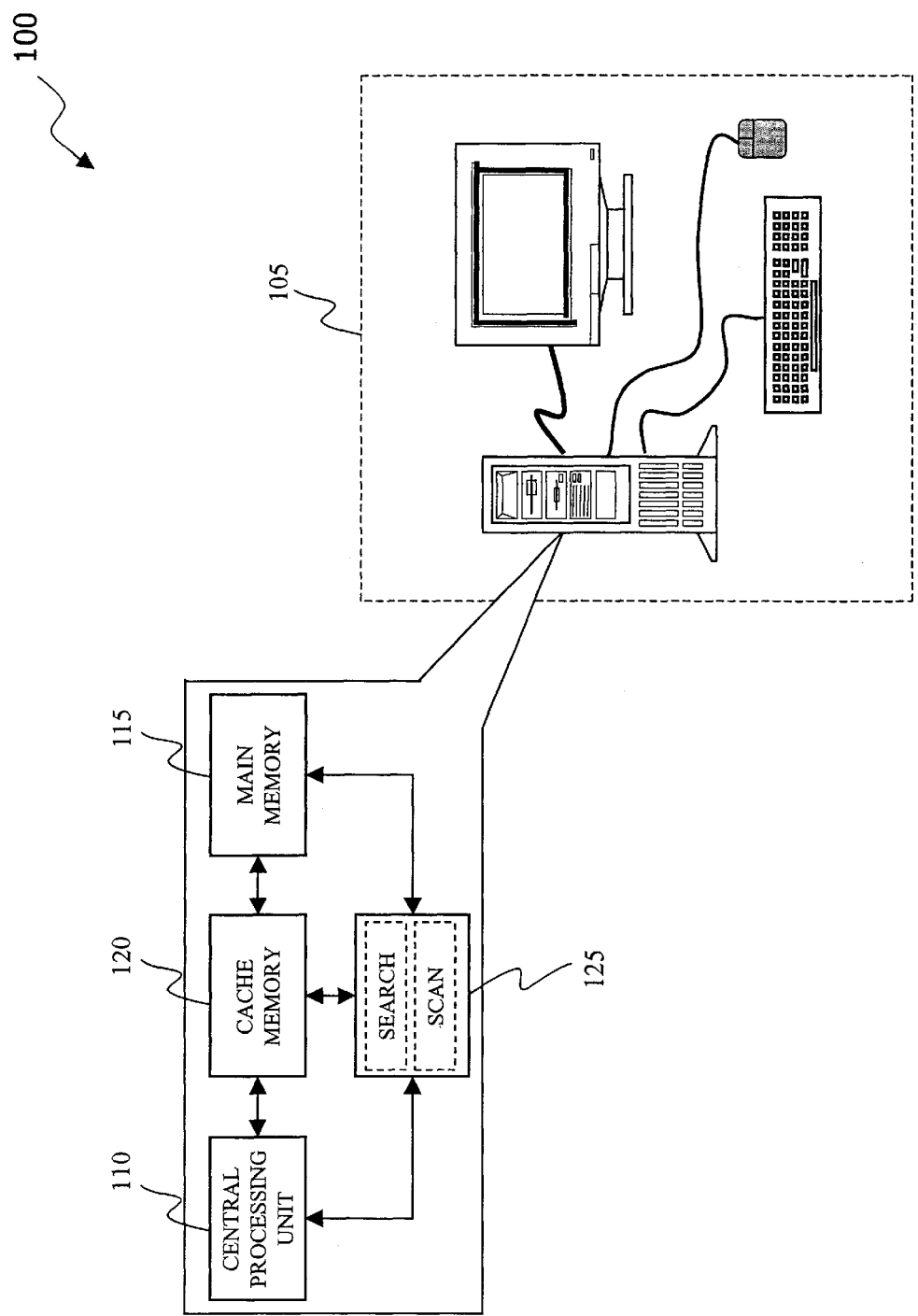
FIG. 1 illustrates a system diagram of a database management system constructed in accordance with the principles of the present invention.

Referring initially to FIG. 1, illustrated is a system diagram of a database management system, generally designated 100, constructed in accordance with the principles of the present invention. The database management system 100 includes a computer 105 having a central processing unit 110, a main memory 115 containing a database employing indices, a cache memory 120, associated with the central processing unit 110 and the main memory 115, and a prefetch system 125. The prefetch system 125 cooperates with the cache memory 120 that is coupled to the database employing indices and includes a search subsystem that prefetches cache lines containing an index of a node of a tree structure associated with the database. The prefetch system 125 also includes a scan subsystem that prefetches cache lines based on an index prefetch distance between first and second leaf nodes of the tree structure.

In an exemplary embodiment, the prefetch system 125 may be embodied entirely in a software configuration that resides in the computer 105. In an alternative embodiment, the prefetch system 125 may be embodied entirely in a hardware configuration that is associated with the computer 105. In yet another embodiment, the prefetch system 125 may have a configuration that is composed partially of software and partially of hardware that operate in concert to perform prefetching.

The computer 105 may provide mechanisms for coping with large cache miss latencies. It may allow multiple outstanding cache misses to be in flight simultaneously for the sake of exploiting parallelism within a memory hierarchy. For example, a computer system such as the Compaq ES40 supports 32 in-flight loads, 32 in-flight stores, and eight outstanding off-chip cache misses per processor. Also, its crossbar memory system supports 24 outstanding cache misses. Additionally, to help applications take full advantage of this parallelism, such computer systems also provide prefetch instructions which enable software to move data into the cache memory before it is needed.

Prefetching may successfully hide much of the performance impact of cache misses by overlapping them for both array-based and pointer-based program codes. Performance gain increases may be defined as an original time divided by the improved time associated with computation and other misses. Therefore for modern machines, it is not the number of cache misses that dictates performance, but rather the amount of exposed miss latency that cannot be successfully hidden through techniques such as prefetching.

In the illustrated embodiment of the present invention, Prefetching B$^+$-Trees (pB$^+$-Trees), which use prefetching to limit the exposed miss latency are presented. Tree-based indices such as B$^+$-Trees pose a major challenge for prefetching search and scan accesses since both access patterns suffer from a pointer-chasing problem. That is, the data dependencies through pointers make it difficult to prefetch sufficiently far ahead to appropriately limit the exposed miss latency. For index searches, pB$^+$-Trees reduce this problem by having wider nodes than the natural data transfer size. For example, eight cache lines verse one cache line (or disk pages) may be employed. These wider nodes reduce the height of the tree structure, thereby decreasing the number of expensive misses when going from a parent node to a child node.

By the appropriate use of prefetching, the advantageously wider tree nodes may be achieved at small additional cost since all of the cache lines in a wider node can be fetched almost as quickly as the single cache line of a traditional node. To accelerate index scans, arrays of pointers are introduced to the B$^+$-Tree leaf nodes, which allow prefetching arbitrarily far ahead. This action thereby hides the normally expensive cache misses associated with traversing the leaves within the range. Of course, indices may be frequently updated. Insertion and deletion times typically decrease despite any overheads associated with maintaining the wider nodes and the arrays of pointers. Contrary to conventional wisdom, the optimal B$^+$-Tree node size on a modern machine is often wider than the natural data transfer size, since prefetching allows fetching each piece of the node simultaneously.

In an alternative embodiment, the following advantages relative to CSB+-Trees may be provided. Better search performance is achieved due to an increase in the fanout by more than the factor of two that CSB+-Trees provide (e.g.,.a factor of eight in the illustrated embodiment). Enhanced performance is achieved on updates relative to B+-Trees, since an improved search speed more than offsets any increase in node split cost due to wider nodes. Also, fundamental changes are not required to the original B+-Tree data structures or algorithms. In addition, the approach is complementary to CSB+-Trees.

Typically, the pB+-Tree may effectively hide over 90% of the cache miss latency suffered by (non-clustered) index scans. This may result in a factor of 6.5 to 8.7 speedup over a range of scan lengths. Although the illustrated embodiment employs the context of a main memory database, alternative embodiments are also applicable to hiding disk latency, in which case the prefetches will move data from a disk (such as a hard drive or floppy drive) into main memory.

Figure 2:
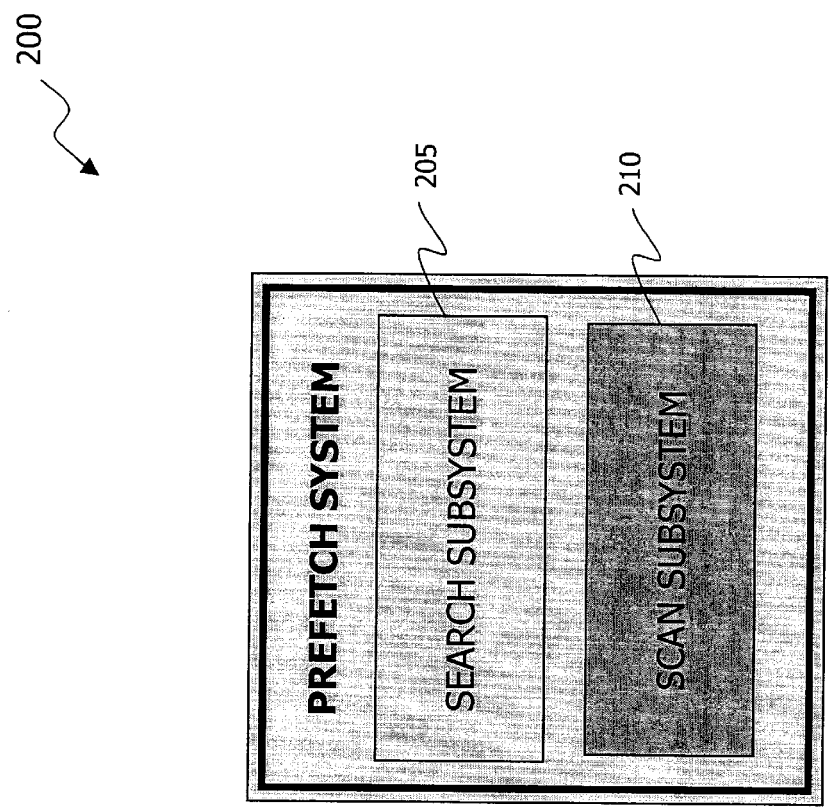
FIG. 2 illustrates a block diagram of a prefetch system constructed in accordance with the principles of the present invention.

Turning now to FIG. 2, illustrated is a block diagram of a prefetch system, generally designated 200, constructed in accordance with the principles of the present invention. In the illustrated embodiment, the prefetch system 200 may be employed with a cache memory that is associated with a database employing indices. The prefetch system 200 includes a search subsystem 205 and a scan subsystem 210. The search subsystem 205 is configured to prefetch cache lines containing an index of a node of a tree structure associated with the database. The scan subsystem 210 is configured to prefetch cache lines based on an index prefetch distance between first and second leaf nodes of the tree structure.

In the illustrated embodiment, the search subsystem 205 is configured to employ a binary search and to prefetch each cache line associated with a selected node of the tree structure. Alternatively, the search subsystem 205 may be configured to prefetch each cache line associated with selected nodes along a path from a root node to a leaf node of the tree structure. The scan subsystem 210 may determine the index prefetch distance employing an external jump pointer array, or it may be determined by an internal jump pointer array. In an exemplary embodiment, the internal jump pointer array is configured to employ at least two bottom non-leaf nodes of the tree structure.

During a B+-Tree search without prefetching, the process typically starts from the root of the tree structure and performs a binary search in each non-leaf node to determine which child to visit next. Upon reaching a leaf node, a final binary search returns the key position. At least one expensive cache miss may be expected to occur each time a level is traversed in the tree. Therefore, the number of cache misses is roughly proportional to the height of the tree (minus any nodes that might remain in the cache if the index is reused). In the absence of prefetching when all cache misses are equally expensive and cannot be overlapped, making the tree nodes wider than the natural data transfer size (i.e., a cache line for main-memory databases or a disk page for disk-resident databases) actually reduces performance. This occurs since the number of additional cache misses at each node more than offsets the benefits of reducing the number of levels in the tree.

Turning now to FIGS. 3A, 3B, and 3C collectively, illustrated are graphs, generally designated 300A, 300B, 300C respectively, showing cache misses versus cycle times for various search situations. As an example, consider a main-memory B+-Tree holding 1000 keys where the cache line size is 64 bytes and the keys, child pointers, and tupleIDs are all four bytes. Limiting the node size to one cache line, the B+-Tree will contain at least four levels. FIG. 3A illustrates a resulting cache behavior where the four cache misses cost a total of 600 cycles on an exemplary Compaq ES40-based machine. Doubling the node width to two cache lines allows the height of the B+-Tree to be reduced to three levels. However, as seen in FIG. 3B, this may result in cache behavior having six cache misses, thereby increasing execution time by 50%.

With prefetching, it becomes possible to hide the latency of any miss whose address can be predicted sufficiently early. Returning to the example and prefetching the second half of each two-cache-line-wide tree node so that it is fetched in parallel with the first half (as shown in FIG. 3C) results in significantly better performance being achieved as may be compared with the one-cache-line-wide nodes as shown in FIG. 3A. The extent to which the misses may be overlapped depends upon the implementation details of a memory hierarchy. However, a current trend is toward supporting greater parallelism. In fact, with multiple caches, memory banks and crossbar interconnects, it may be possible to completely overlap multiple cache misses.

FIG. 3c may be illustrative of the timing for an exemplary Compaq ES40-based machine, where back-to-back misses to memory can be serviced once every 10 cycles. This is a small fraction of the overall 150 cycle miss latency. Even without perfect overlap of the misses, large performance gains may still potentially be achieve (a speedup of 1.25 in this example) by creating wider than normal B+-Tree nodes. Therefore, a primary aspect of the pB+-Tree design is to use prefetching to "create" nodes that are wider than the natural data transfer size, but where the entire miss penalty for each extra-wide node is comparable to that of an original B+-Tree node.

Modifications to the B+-Tree algorithm may be addressed by first considering a standard B+-Tree node structure. With reference to Table 1 for definition of notations, each non-leaf node includes some number, d>>1 (where >> indicates "much greater than") of childptr fields, d−1 key fields, and one keynum field that records the number of keys stored in the node (at most d−1). Each leaf node includes d−1 key fields, d−1 tupleID fields, one keynum field, and one next-leaf field that points to the next leaf node in key order. A first modification is to store the keynum and all of the keys prior to any of the pointers or tupleIDs in a node. This simple layout optimization allows a binary search to proceed without waiting to fetch all the pointers. For the illustrated embodiment, salient changes in the search algorithm from a standard B+-Tree algorithm may be summarized as follows.

TABLE 1

Definition of Notations

| Variable | Definition |
|---|---|
| $\omega$ | # of cache lines in an index node |
| m | # of child pointers in a one-line-wide node |
| N | # of (key; tupleID) pairs in an index |
| d | # of child pointers in non-leaf node ($= \omega \times m$) |
| $T_1$ | full latency of a cache miss |
| $T_{next}$ | latency of an additional pipelined cache miss |
| B | normalized memory bandwidth $\left(B = \dfrac{T_1}{T_{next}}\right)$ |

TABLE 1-continued

Definition of Notations

| Variable | Definition |
|---|---|
| k | # of nodes to prefetch ahead |
| c | # of cache lines in jump-pointer array chunk |

Before starting a binary search, all of the cache lines that comprise the node are prefetched. Since an index search is first performed to locate the position for an insertion, all of the nodes on the path from the root to the leaf are already in the cache before the real insertion phase. Therefore, the only additional cache misses are caused by newly allocated nodes, which are prefetched in their entirety before redistributing the keys. For deletions, a "lazy deletion" is performed. If more than one key is in the node, the key is simply deleted. It is only when the last key in a node is deleted that a redistribution of keys or deletion of the node is attempted. Since an index search is also performed prior to deletion, the entire root-to-leaf path is in the cache. Key redistribution is the only potential cause of additional cache misses. Therefore, when all keys in a node are deleted, the sibling node is prefetched from which keys may be redistributed.

Prefetching may also be used to accelerate the bulkload of a B+-Tree. However, because this is expected to occur infrequently, attention has been focused on the more frequent operations of search, insertion and deletion. In the illustrated embodiment, fixed-size keys, tupleIDs, and pointers are considered for simplicity. It is also assumed that tupleIDs and pointers are the same size. One skilled in the pertinent art will realize that these conditions are only exemplary and that other conditions are well within the broad scope of the present invention.

As discussed earlier, search times are expected to improve through the scheme presented since it reduces the number of levels in the B+-Tree without significantly increasing the cost of accessing each level. Updates always begin with a search phase. The expensive operations typically occur either when a node becomes too full upon an insertion and must be split, or when a node becomes empty upon a deletion and keys must be redistributed. Although node splits and key redistributions are more costly with larger nodes, the relative frequency of these expensive events may typically decrease. Therefore, update performance is expected to be comparable to, or perhaps even better than, B+-Trees with single-line nodes.

The space overhead of the index is reduced with wider nodes. This is primarily due to the reduction in the number of non-leaf nodes. For a full tree, each leaf node contains d−1 (key, tupleID) pairs. The number of non-leaf nodes is dominated by the number of nodes in the level immediately above the leaf nodes and therefore approximately equal to N/d(d−1). As the fanout d increases with wider nodes, the node size grows linearly but the number of non-leaf nodes decreases quadratically, resulting in a nearly linear decrease in the non-leaf space overhead.

There are two system parameters that typically affect a determination of an optimal node size, given prefetching. The first system parameter is the extent to which the memory subsystem can overlap multiple cache misses. This may be quantified as the latency of a full cache miss $T_1$ divided by the additional time until another pipelined cache miss $T_{next}$ would also complete. This ratio (i.e., $T_1/T_{next}$) may be called the normalized bandwidth B. For example, in the Compaq ES40-based machine example, $T_1$=150 cycles, $T_{next}$=10 cycles, and therefore the normalized bandwidth B=15.

The larger a value of the normalized bandwidth B, the greater the ability of a system to overlap parallel accesses, and the greater a likelihood of benefitting from wider index nodes. In general, it may be expected that an optimal number of cache lines per node $w_{optimal}$ will not exceed the normalized bandwidth B. Beyond that point a binary search could have been competed with readiness to move down to the next level in the tree. The second system parameter that potentially limits the optimal node size is the size of the cache, although in practice this does not appear to be a limitation given realistic values of the normalized bandwidth B.

Now consider a more quantitative analysis of an optimal node width $w_{optimal}$. A pB+-Tree with N (key, tupleID) pairs contains at least $$\left[\log_d\left(\frac{N}{d-1}\right)+1\right]$$

levels. Using a data layout optimization that employs putting keys before child pointers, three out of four nodes are read on average. Therefore, the average memory stall time for a search in a full tree may be expressed as:

$$\left[\log_d\left(\frac{N}{d-1}\right)+1\right]\times\left(T1+\left(\left[\frac{3w}{4}\right]-1\right)\times T_{next}\right) =$$

$$T_{next}\times\left[\log_{wm}\frac{N}{wm-1}+1\right]\times\left(B+\left[\frac{3w}{4}\right]-1\right)$$

By computing the value of w that minimizes this cost, we can find the optimal node width $w_{optimal}$. For example, in our simulations where m=8 and B=15, by averaging over tree sizes N=$10^3$, . . . , $10^9$, it may be computed from the equation above that the optimal node width $w_{optimal}$ equals 8. If the memory subsystem bandwidth increases such that B equals 50, then the optimal node width $w_{optimal}$ increases to 22. When comparing the pB+-Trees with conventional B+-Trees, better search performance, comparable or somewhat better update performance, and lower space overhead may be expected.

Having addressed index search performance, index range scans will now be addressed. Given starting and ending keys as arguments, an index range scan returns a list of either the tupleIDs or the tuples themselves with keys that fall within this range. First, a starting key is searched in the B+-Tree to locate a starting leaf node. Then a scan follows the next-leaf pointers, visiting the leaf nodes in order. As the scan proceeds, the tupleIDs (or tuples) are copied into a return buffer. This process stops when either the ending key is found or the return buffer fills up. In the latter case, the scan procedure pauses and returns the buffer to the caller (often a join node in a query execution plan), which then consumes the data and resumes the scan where it left off. Therefore, range selection involves one key search and often multiple leaf node scan calls. Range selections that return tupleIDs will be specifically addressed, although returning the tuples themselves or other variations is a straightforward extension of the algorithm.

Turning now to FIGS. 4A, 4B, and 4C collectively, illustrated are graphs, generally designated 400A, 400B, 400C respectively, showing cache misses versus cycle times for various scan situations. In general and without prefetching, the cache performance of range scans may suffer by over 84% due to data cache misses. FIG. 3A illustrates this situation where a full cache miss latency is suffered for each leaf node. A partial solution to this situation is to make the leaf nodes multiple cache lines wide and prefetch each component of a leaf node in parallel. This may reduce the frequency of expensive cache misses, as illustrated in FIG. 4B. While this is helpful, a goal to hide fully the miss latencies to the extent permitted by the memory system, may be achieved as illustrated in FIG. 4C. To accomplish this goal, a pointer-chasing problem needs to be overcome.

Assuming that three nodes worth of computation are needed to hide a miss latency, then when a node $n_i$ is visited one would like to be launching a prefetch of a node $n_{i+3}$. To compute the address of the node $n_{i+3}$, the pointer chain would normally follow through the nodes $n_{i+1}$ and $n_{i+2}$. However, this would incur a full miss latency to fetch the node $n_{i+1}$ and then to fetch the node $n_{i+2}$, before the prefetch of the node $n_{i+3}$ could be launched, thereby defeating our goal of hiding the miss latency of $n_{i+3}$. The concept of jump pointers that are customize to the specific needs of $B^+$-Tree indices may be employed.

In an exemplary embodiment of the present invention, jump pointer arrays are separate arrays that store these jump pointers, rather than storing jump pointers directly in the leaf nodes. The jump pointer arrays may also employ a back-pointer associated with a starting leaf node to locate the leaf's position within the jump pointer array. Then, based on a desired index prefetching distance, an array offset is adjusted to find the address of the appropriate leaf node to prefetch. As the scan proceeds, the prefetching task simply continues to walk ahead in the jump-pointer array (which itself is also prefetched) without having to dereference the actual leaf nodes again.

Jump-pointer arrays are more flexible than jump pointers stored directly in the leaf nodes. The prefetching distance may be adjusted by simply changing the offset used within the jump pointer array. This allows dynamic adaptation to changing performance conditions on a given machine, or if an associated software code is migrated to a different machine. In addition, the same jump-pointer array can be reused to target different latencies in the memory hierarchy (e.g., disk latency vs. memory latency). From an abstract perspective, one might think of the jump-pointer array as a single large, contiguous array as will be discussed with respect to FIG. 5A below. This configuration may be efficient in read-only situations, but would typically create problems in other situations. A key issue in implementing jump-pointer arrays may involve updates.

Turning now to FIG. 5A, illustrated is a block diagram showing an embodiment of a tree structure, generally designated 500A, employing an independent and contiguous jump pointer array. The tree structure 500 includes a collection of non-leaf nodes collectively designated 505A, a collection of leaf nodes collectively designated 510A and a jump pointer array 515A having a single, contiguous array arrangement. This independent, single, contiguous jump pointer array 515A may create a problem during updates, however. When a leaf is deleted, an empty slot is typically left in the single contiguous array. When a new leaf is inserted, an empty slot needs to be created in the appropriate position for a new jump pointer. If no nearby empty slots can be located, this may potentially involve copying a very large amount of data within the single contiguous jump pointer array 515A to create the empty slot. In addition, for each jump-pointer that is moved within the single contiguous jump pointer array 515A, the corresponding back-pointer from the leaf node into the array also needs to be updated, which may be very costly to performance.

Turning now to FIG. 5B, illustrated is a block diagram showing an embodiment of a tree structure, generally designated 500B, employing a chunked, independent jump pointer array constructed in accordance with the principles of the present invention. The tree structure 500B includes a collection of non-leaf nodes 505B, a collection of leaf nodes 510B and a chunked jump point array 515B having link lists with hint back-pointers. The chunked jump point array 515B allows several performance improvements over a contiguous jump pointer array such as that discussed with respect to FIG. 5A above.

First, breaking a contiguous array into a chunked linked list, as illustrated in FIG. 5B, allows the impact of an insertion to its corresponding chunk to be limited. Second, actively attempting to interleave empty slots within the chunked jump pointer array 515B allows insertions to proceed more quickly. During a bulkload or when a chunk splits, the jump pointers are stored such that empty slots are evenly distributed to maximize the chance of finding a nearby empty slot for insertion. When a jump-pointer is deleted, an empty slot in the chunk is left.

Finally, the meaning of a back-pointer in a leaf node corresponding to its position in the jump-pointer array is altered such that it is merely a "hint". The pointer may point to the correct chunk, but a position within that chunk may be imprecise. Therefore when moving jump pointers in a chunk for inserting a new leaf address, there is no need to update the hints for the moved jump pointers. A hint field may be updated when the precise position in the jump-pointer array is looked up during a range scan or insertion.

In this case the leaf node should be already in cache and updating the hint requires minimum overhead. Additionally, a hint field may be updated when a chunk splits and addresses are redistributed. In this case, updating the hints to point to the new chunk is forced. The cost of using hints, of course, is that searching for the correct location within the chunk in some cases is required. In practice, however, the hints appear to be good approximations of the true positions, and searching for the precise location is not a costly operation (e.g., it should not incur many if any cache misses).

In summary, the net effect of these enhancements is that nothing moves during deletions, and typically only a small number of jump pointers (between the insertion position and the nearest empty slot) move during insertions. In neither case does updating the hints within the leaf nodes normally occur. Thus we expect these jump-pointer arrays to perform well during updates.

Having described a data structure to facilitate prefetching, an exemplary embodiment of a prefetching algorithm may now be described. Recall that a basic range scan algorithm consists of a loop that visits a leaf on each iteration by following a next-leaf pointer. To support prefetching, prefetches are added both prior to this loop (for the startup phase), and inside the loop (for the steady-state phase). Let k be the desired prefetching distance, in units of leaf nodes (a selection approach for selecting k is discuss below). During a startup phase, prefetches are issued for the first k leaf nodes. These prefetches proceed in parallel, exploiting the available memory hierarchy bandwidth. During each loop iteration (i.e., in the steady-state phase) and prior to visiting the current leaf node in the range scan, the leaf node that is k nodes after the current leaf node is prefetched. The goal is to ensure that by the time the basic range scan loop is ready to visit a leaf node, that node is already prefetched into the cache. With this framework in mind, further details of an exemplary embodiment may be described.

First, in a startup phase, it is advantageous to locate the jump pointer of the starting leaf within the jump-pointer array. To do this, follow the hint pointer from the starting leaf to see whether it is precise (i.e., whether the hint points to a pointer back to the starting leaf). If not, then start searching within the chunk in both directions relative to the hint position until the matching position is found. Usually, the distance between the hint and the actual position appears to be small in practice.

Second, prefetch the jump-pointer chunks as well as the leaf nodes and handle empty slots in the chunks. During a startup phase, both the current chunk and the next chunk are prefetched. When looking for a jump pointer, test for and skip all empty slots. If the end of the current chunk is reached, go to the next chunk to get the first non-empty jump-pointer (there is at least one non-empty jump pointer or the chunk should have been deleted). Then, prefetch the next chunk ahead in the jump-pointer array. The next chunk is expected to be in the cache by the time it is accessed since it is always prefetched before prefetching any leaf nodes pointed to by the current chunk. Third, although the actual number of tupleIDs in the leaf node is unknown when range prefetching is done, it is assumed that the leaf is full and the return buffer area is prefetched accordingly. Thus, the return buffer will always be prefetched sufficiently early.

Selecting the index prefetching distance and the chunk size may now be addressed. A value of an index prefetching distance k, (where the value of the prefetching distance k is in units of nodes to prefetch ahead) may be selected as follows. Normally this quantity is derived by dividing the expected worst-case miss latency by the computation time spent on one leaf node. However, because the computation time associated with visiting a leaf node during a range scan is quite small relative to the miss latency, it will be assumed that the limiting factor is the memory bandwidth B. One may estimate this bandwidth-limited prefetching distance as k=B/w, where B is the normalized memory bandwidth and w is the number of cache lines per leaf node, as defined in Table 1. In practice, there is no problem with increasing k to create a performance margin, since any prefetches that cannot proceed are simply buffered within the memory system.

In selecting a chunk size c, chunks must be sufficiently large to ensure that prefetching one chunk ahead to hide a miss latency of accessing the chunks themselves is assured. During the steady-state phase of a range scan associated with obtaining a new chunk, the next chunk is immediately prefetched ahead so that its fetch time can be overlapped with the time it takes to prefetch the leaf nodes associated with the current chunk. Since the memory hierarchy only has enough bandwidth to initiate B cache misses during the time it takes one cache miss to complete, the chunks would clearly be large enough to hide the latency of fetching the next chunk if they contained at least B leaf pointers (there is at least one cache line access for every leaf visit).

For a full tree with no empty leaf slots and no empty chunk slots, each cache line can hold 2 m leaf pointers (since there are only pointers and no keys). In this case in can be estimated that the minimum chunk size c in units of cache lines is c=B/2 m. To account for empty chunk slots, the denominator (2 m) may be multiplied by the occupancy of chunk slots (a value similar to the bulkload factor), which would increase the value of the minimum chunk size c somewhat.

Another factor that may dictate the minimum chunk size c is that each chunk should contain at least k leaf pointers so that the prefetching algorithm may operate sufficiently far ahead. However, since the prefetching distance k is less than or equal to the normalized memory bandwidth B, the chunk size c in the equation above should be sufficient. Increasing the chunk size c beyond this minimum value to account for empty leaf nodes and empty chunk slots will typically improve performance, however. Given sufficient memory system bandwidth, the prefetching scheme of this exemplary embodiment tends to hide the full memory latency experienced at every leaf node visited during range scan operations. Additionally, good performance on updates is also anticipated.

However, there is a space overhead associated with employing a jump-pointer array. Since the jump pointer array may only contain one pointer per leaf node, the space overhead is relatively small. Since a next-leaf pointer and a back-pointer are stored in every leaf, there are at most d−2(key, tupleID) pairs in every leaf nodes (where d is defined in Table 1). So, the jump pointer for a full leaf node only takes ½(d−2) as much space as the leaf node. The resulting increase in the fanout d for creating wider B$^+$-Tree nodes will help reduce this overhead. However, this space overhead may be reduced further.

Figure 6:
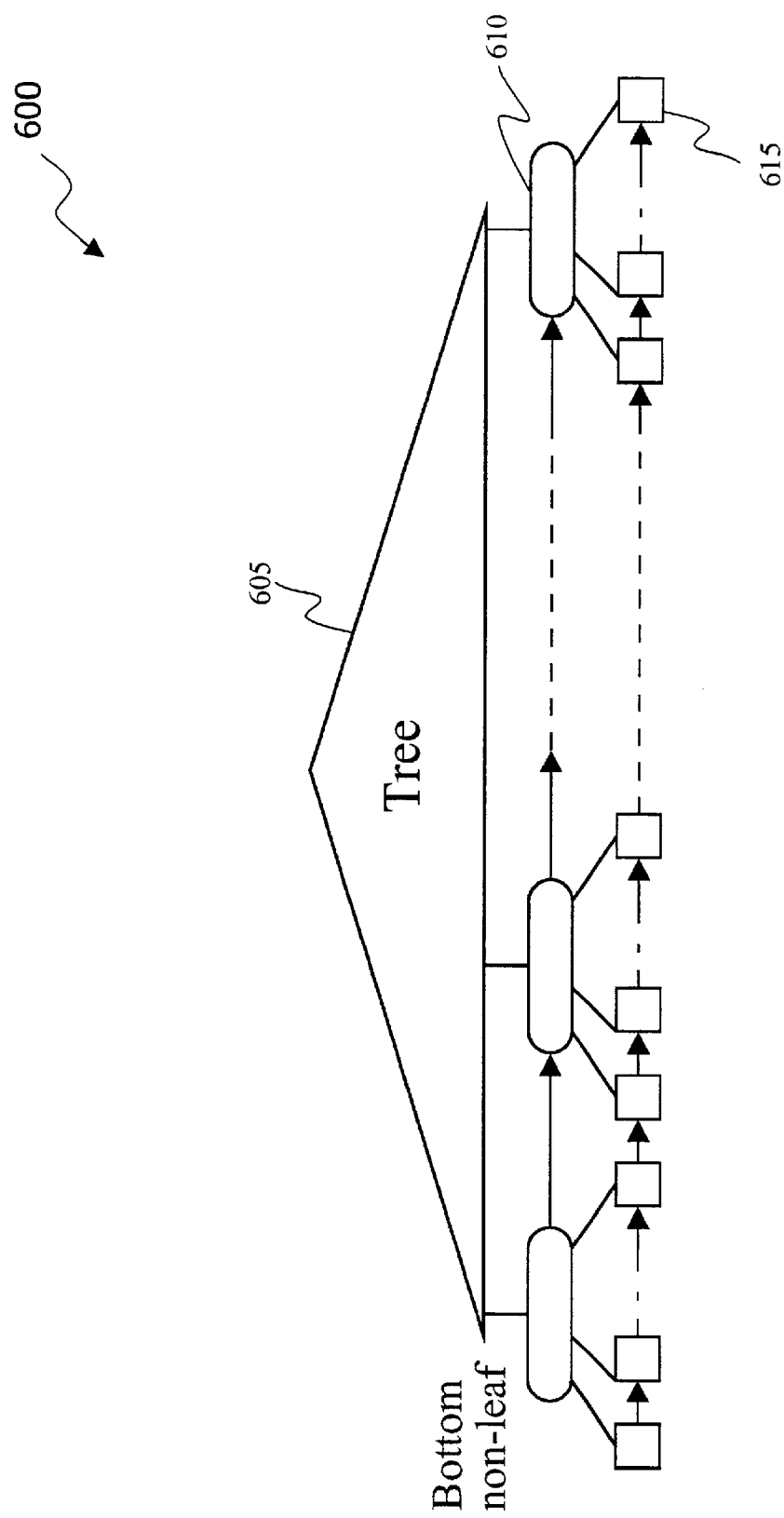
FIG. 6 illustrates a block diagram of an embodiment of a tree structure employing an internal jump pointer array constructed in accordance with the principles of the present invention.

Turning now to FIG. 6, illustrated is a block diagram of an embodiment of a tree structure, generally designated 600, employing an internal jump pointer array constructed in accordance with the principles of the present invention. The tree structure 600 includes a collection of non-leaf nodes 605, a collection of leaf nodes 610 and a collection of internal jump pointer arrays 615. In the preceding embodiments, discussions and examples were presented that described how a jump-pointer array may be implemented by creating a new external structure to store the jump pointers (as illustrated earlier with respect to FIGS. 5A and 5B).

However, there is an existing structure within a B$^+$-Tree, for example, that already contains pointers to the leaf nodes, namely, the parents of the leaf nodes. These parent nodes may be called bottom non-leaf nodes. Child pointers within a bottom non-leaf node correspond to the jump-pointers within a chunk of the external jump-pointer array as was described above. A key difference, however, is that there is typically no easy way to traverse these bottom non-leaf nodes quickly enough to perform prefetching. A potential solution is to connect these bottom non-leaf nodes together in leaf key order using linked-list pointers. FIG. 6 illustrates this concept as the internal jump-pointer arrays 615. It may be noted that leaf nodes do not contain back-pointers to their positions within their parents. However, such pointers are not necessary for this internal implementation, since the position will be determined during the search for the starting key. Simply retaining the result of the binary search of the bottom non-leaf nodes 610, will produce the position to appropriately initiate the prefetching operation.

This approach is attractive with respect to space overhead, since the only overhead is one additional pointer per bottom non-leaf node 610. The overhead of updating this pointer may be substantially insignificant, since it only needs to be changed in the rare event that a bottom non-leaf node splits or is deleted. A potential limitation of this approach, however, is that the length of a "chunk" in this embodiment of a jump-pointer array is dictated by the B$^+$-Tree structure and may not be easily adjusted to satisfy large prefetch distance requirements (e.g., for hiding disk latencies)

Figure 7:
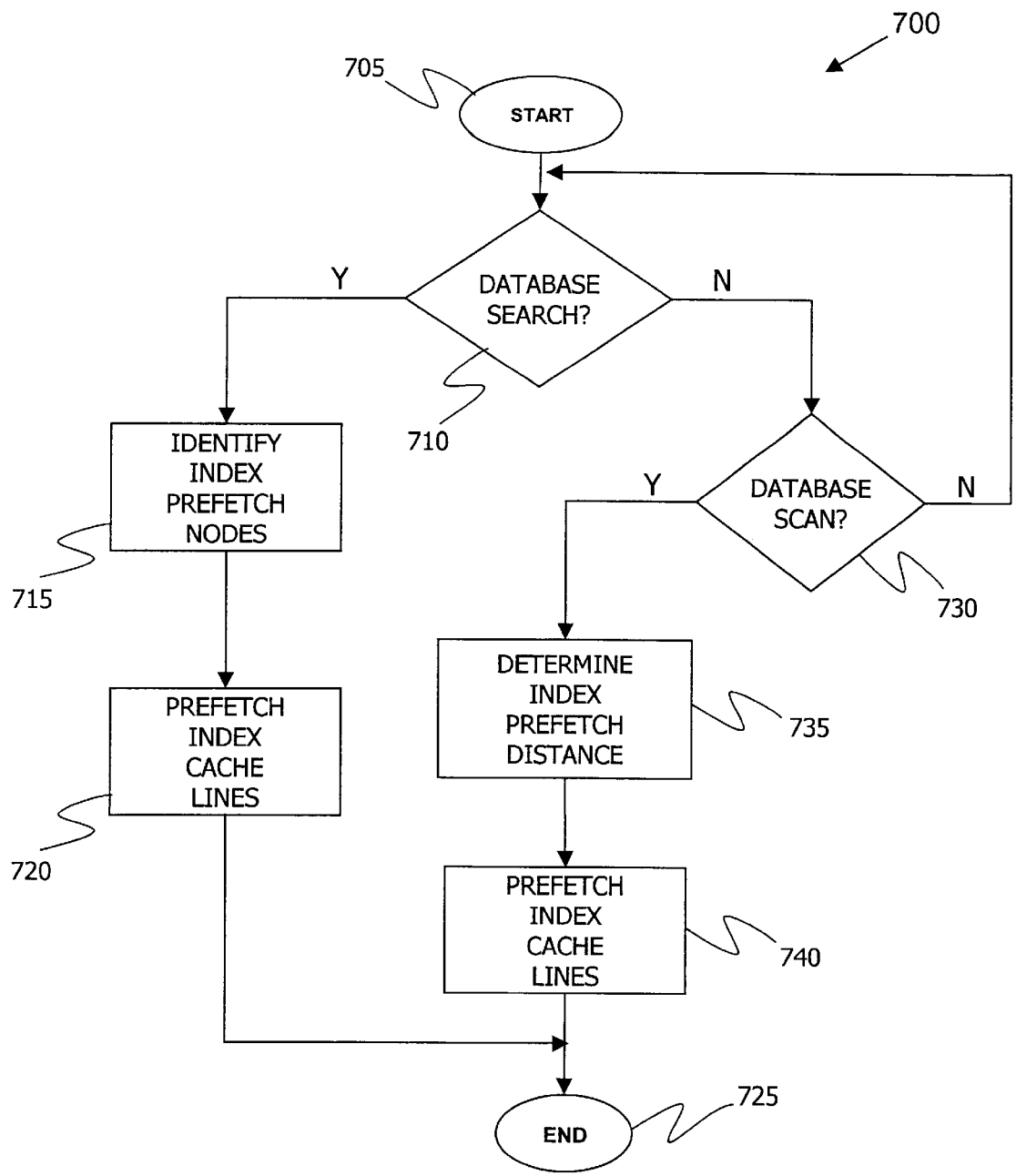
FIG. 7 illustrates a flow diagram of an embodiment of a method of prefetching constructed in accordance with the principles of the present invention.

Turning now to FIG. 7, illustrated is a flow diagram of an embodiment of a method of prefetching, generally designated 700, constructed in accordance with the principles of the present invention. The method 700, for use with a cache memory associated with a database employing indices, starts in a step 705 and proceeds to a first decisional step 710. The first decisional step 710 determines if a database search is to be performed, and the method 700 proceeds to a step 715 if a search is to be performed.

A search includes prefetching cache lines containing an index of a node of a tree structure associated with the database. The step 715 identifies the index nodes whose associated cache lines are to be prefetched. In the illustrated embodiment of method 700, a binary search is performed and each cache line associated with selected nodes along a path from a root node to a leaf node of the tree structure may be considered for prefetching. In an alternative embodiment, each cache line associated with a selected node of the tree structure may be considered for prefetching. Then, in a step 720, the appropriate cache lines are prefetched and the method 700 ends in a step 725.

Returning to the first decisional step 710 and for the case where a database search is not to be performed, a second decisional step 730 determines if a database scan is to be performed. Performing a database scan includes prefetching cache lines based on an index prefetch distance between first and second leaf nodes of the tree structure. The index prefetch distance is determined in a step 735 employing an external jump pointer array or an internal jump pointer array wherein the internal jump pointer array uses at least two bottom non-leaf nodes of the tree structure. Then, in a step 740, the appropriate cache lines are prefetched and the method 700 ends in a step 725. If a database scan is not to be performed in the second decisional step 730, the method 700 returns to the first decisional step 710.

In summary, several embodiments of a prefetch system for use with a cache memory that is associate d with a database employing indices have been provided. Additionally, embodiments of a database management system employing the prefetch system and a method of prefetching have also been provided. In general, the prefetch system and method of prefetching accelerate the two important operations of searches and range scans on $B^+$-Tree indices. To accelerate searches, $pB^+$-Trees use prefetching to effectively create wider nodes than the natural data transfer size (e.g., eight vs. one cache lines or disk pages). These wider nodes reduce the height of the $B^+$-Tree, thereby decreasing the number of expensive misses when going from parent to child without significantly increasing the cost of fetching a given node.

The results of the embodiments presented indicate that for an index search, the prefetch system may achieve an increase of 1.27 to 1.55 over the $B^+$-Tree, by decreasing the height of the tree. Additionally, for an index scan, the prefetch system may achieve an increase of 3.5 to 3.7 over the $B^+$-Tree, again due to the faster search and wider nodes. Moreover, jump-pointer arrays were proposed, which enable effective range scan prefetching across node boundaries. Overall, the $pB^+$-Tree achieves a speedup of about 6.5 to 8.7 over the $B^+$-Tree for range scans. For index updates (insertions and deletions), the technique may achieve an increase of 1.24 to 1.52 over the $B^+$-Tree, due to faster search and less frequent node splits with wider nodes. Of course, application of the principles of the present invention to other current or future developed tree structures is well within the broad scope of the present invention.

Although the present invention has been described in detail, those skilled in the art should understand that they can make various changes, substitutions and alterations herein without departing from the spirit and scope of the invention in its broadest form.

What is claimed is:

1. A method of prefetching for use with a cache memory associated with a database employing indices, comprising:

prefetching cache lines containing an index of a node of a tree structure associated with said database; and prefetching at least one cache line associated with a second leaf node of said tree structure that is located an index prefetch distance from a first leaf node said tree structure.

2. The method as recited in claim 1 wherein said prefetching comprises prefetching each cache line associated with a selected node of said tree structure.

3. The method as recited in claim 1 wherein said prefetching comprises prefetching each cache line associated with selected nodes along a path from a root node to a leaf node of said tree structure.

4. The method as recited in claim 1 wherein said prefetching employs a binary search without waiting to fetch pointers of nodes of said tree structure.

5. The method as recited in claim 1 wherein said index prefetch distance is determined by an external or internal jump pointer array.

6. The method as recited in claim 5 wherein employing said internal jump pointer array employs at least two bottom non-leaf nodes of said tree structure.

7. The method as recited in claim 1 wherein said index prefetch distance is limited by a bandwidth of a memory associated with said prefetch system.

8. A prefetch system for use with a cache memory associated with a database employing indices, comprising:

a search subsystem configured to prefetch cache lines containing an index of a node of a tree structure associated with said database; and a scan subsystem configured to prefetch at least one cache line associated with a second leaf node of said tree structure that is located an index prefetch distance from a first leaf node of said tree structure.

9. The prefetch system as recited in claim 8 wherein said search subsystem is configured to prefetch each cache line associated with a selected node of said tree structure.

10. The prefetch system as recited in claim 8 wherein said search subsystem is configured to prefetch each cache line associated with selected nodes along a path from a root node to a leaf node of said tree structure.

11. The prefetch system as recited in claim 8 wherein said search subsystem is configured to employ a binary search without waiting to fetch pointers of nodes of said tree structure.

12. The prefetch system as recited in claim 8 wherein said index prefetch distance is determined by an external or internal jump pointer array.

13. The prefetch system as recited in claim 12 wherein said internal jump pointer array is configured to employ at least two bottom non-leaf nodes of said tree structure.

14. The prefetch system as recited in claim 8 wherein said index prefetch distance is limited by a bandwidth of a memory associated with said prefetch system.

15. A database management system, comprising:

a computer employing a central processing unit;

a main memory containing a database employing indices;

a cache memory associated with said central processing unit and said main memory; and a prefetch system for use with said cache memory that is coupled to said database employing indices, including:

a search subsystem that prefetches cache lines containing an index of a node of a tree structure associated with said database; and a scan subsystem that prefetches at least one cache line associated with a second leaf node of said tree structure that is located an index prefetch distance from a first leaf node of said tree structure.

16. The database management system as recited in claim 15 wherein said search subsystem prefetches each cache line associated with a selected node of said tree structure.

17. The database management system as recited in claim 15 wherein said search subsystem prefetches each cache line associated with selected nodes along a path from a root node to a leaf node of said tree structure.

18. The database management system as recited in claim 15 wherein said search subsystem employs a binary search without waiting to fetch pointers of nodes of said tree structure.

19. The database management system as recited in claim 15 wherein said index prefetch distance is determined by an external or internal jump pointer array.

20. The database management system as recited in claim 19 wherein said internal jump pointer array employs at least two bottom non-leaf nodes of said tree structure.

21. The database management system as recited in claim 15 wherein said index prefetch distance is limited by a bandwidth of said main memory.

* * * * *